US010423984B2

(12) United States Patent
Matus (10) Patent No.: US 10,423,984 B2
(45) Date of Patent: Sep. 24, 2019

(54) SPONSORED STORIES IN NOTIFICATIONS (71) Applicant: Facebook, Inc., Menlo Park, CA (US)

(72) Inventor: Jonathan Arie Matus, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 529 days.

(21) Appl. No.: 13/653,057

(22) Filed: Oct. 16, 2012

(65) Prior Publication Data

US 2014/0108153 A1   Apr. 17, 2014

(51) Int. Cl.
*G06Q 30/02* (2012.01)
*G06Q 50/00* (2012.01)

(52) U.S. Cl.
CPC ......... *G06Q 30/0269* (2013.01); *G06Q 50/01* (2013.01)

(58) Field of Classification Search
CPC .................................................... G06Q 30/02
USPC ...................................................... 705/14.25
See application file for complete search history.

(56) References Cited

U.S. PATENT DOCUMENTS

| 2009/0319359 | A1* | 12/2009 | Soza | G06Q 30/02 705/14.25 |
|---|---|---|---|---|
| 2010/0159904 | A1 | 6/2010 | Colligan | |
| 2010/0185507 | A1* | 7/2010 | Tokuda | 705/14.41 |
| 2011/0288935 | A1* | 11/2011 | Elvekrog et al. | 705/14.53 |
| 2012/0158501 | A1 | 6/2012 | Zhang | |
| 2012/0232998 | A1 | 9/2012 | Schoen | |

FOREIGN PATENT DOCUMENTS

| KR | 10-1039197 B1 | 6/2011 |
|---|---|---|
| KR | 10-1130964 B1 | 4/2012 |
| WO | WO 2012/125426 A1 | 9/2012 |

OTHER PUBLICATIONS

International Search Report and Written Opinion for International Application PCT/US2013/064901, dated Apr. 22, 2014.
Japan Patent Office, Office Action, Japanese Patent Application No. 2015-537762, dated Oct. 24, 2017, ten pages.
Australian Government, IP Australia, Examination report No. 1 for standard patent application, Australian Patent Application No. 2013331526, dated Mar. 20, 2018, three pages.
Canadian Intellectual Property Office, Office Action, Canadian Patent Application No. 2,886,936, dated Jun. 28, 2017, three pages.
Israel Patent Office, Office Action, Israeli Patent Application No. 238048, dated Jul. 24, 2017, thirteen pages.

* cited by examiner

*Primary Examiner* — Anita Coupe
*Assistant Examiner* — Darnell A Pouncil
(74) *Attorney, Agent, or Firm* — Fenwick & West LLP (57) ABSTRACT Particular embodiments receive a request from a user of the social networking system to view notifications. One or more notifications for the user may be assessed based on advertisement criteria for target social actions. Advertisements and corresponding criteria may be provided by a third party. Relevance scores may be determined for at least one of the one or more advertisements with respect to the user. At least one advertisement may be selected for delivery to the user in a notification interface. Advertisement(s) may be selected when corresponding relevance score(s) exceed a pre-determined threshold score. Finally, the selected at least one advertisement may be provided to a notification controller for delivery to the user.

15 Claims, 5 Drawing Sheets

SPONSORED STORIES IN NOTIFICATIONS

TECHNICAL FIELD

This disclosure generally relates to delivery of advertisements to a user, and particularly, to the delivery of targeted advertisements to a users's computing device.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

SUMMARY OF PARTICULAR EMBODIMENTS

In particular embodiments, a computing system may select an advertisement for display to a user of a social-networking system in a notification interface of a computing device. The advertisement may be selected based on a metric indicating the relevance of the advertisement to the user. In particular embodiments, the computing system may also select one or more triggering user events to provide accompanying social content for display with the advertisement. The selected advertisement and social content may be combined to generate a sponsored story that is provided to a notification controller. For example, the sponsored story may combine social content indicating that a particular "friend" of the user "likes" or recently purchased a particular product together with an advertisement for the product.

DESCRIPTION OF EXAMPLE EMBODIMENTS

In particular embodiments, a computing system may select an advertisement for display to a user of a social-networking system in a notification interface of a computing device. The advertisement may be selected based on the context of notifications to be displayed in the notification interface, particularly with respect to social actions underlying the notifications. The advertisement may also be selected based on a metric indicating the relevance of the advertisement to the user.

Figure 1:
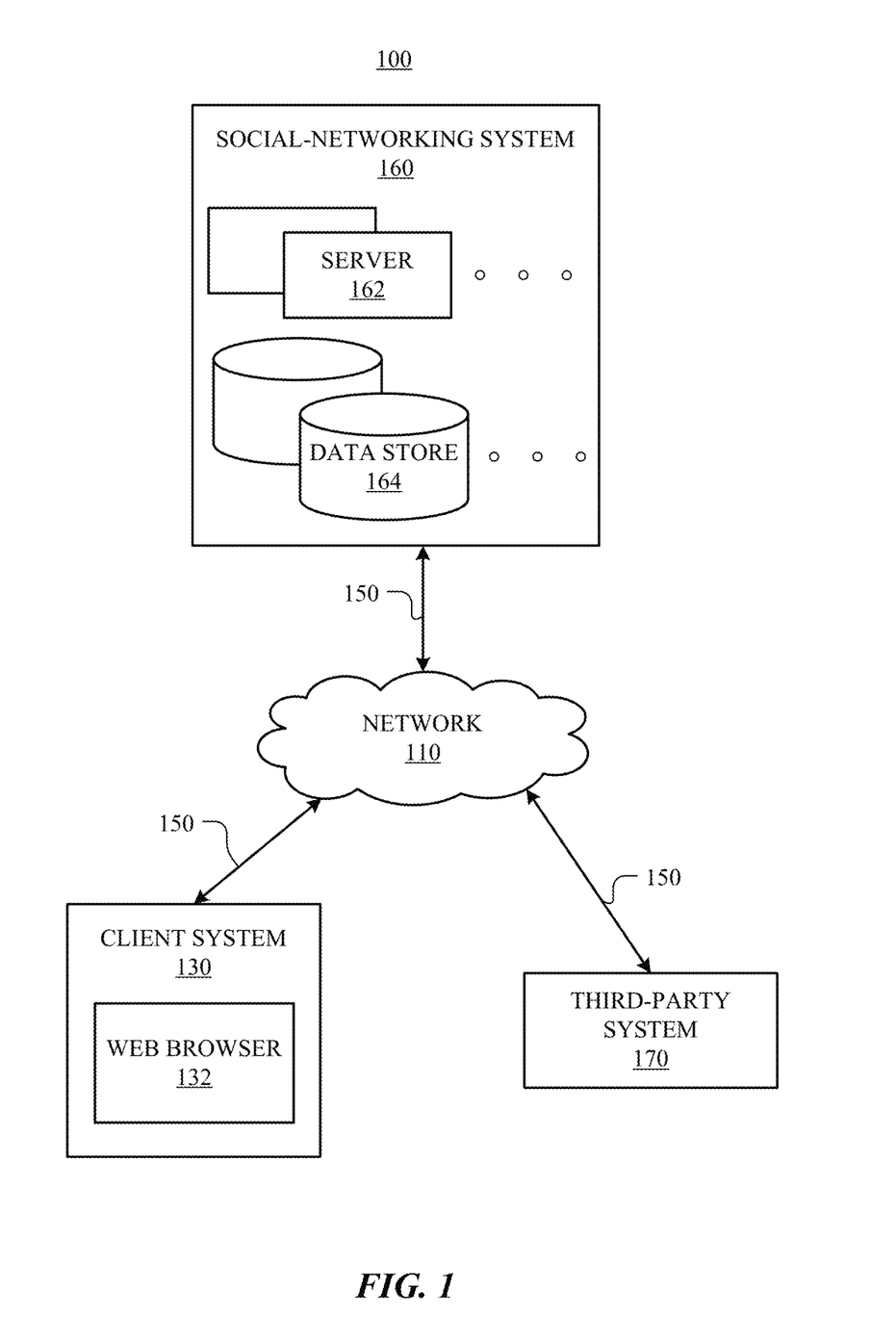
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110. Embodiments of computing devices, including but not limited to computer servers and client devices, are described in greater detail with respect to FIG. 5 in related portions of the specification.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Embodiments of a social graph, including user nodes, concept nodes, and edges, are described in greater detail with respect to FIG. 4 in related portions of the specification. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2A:
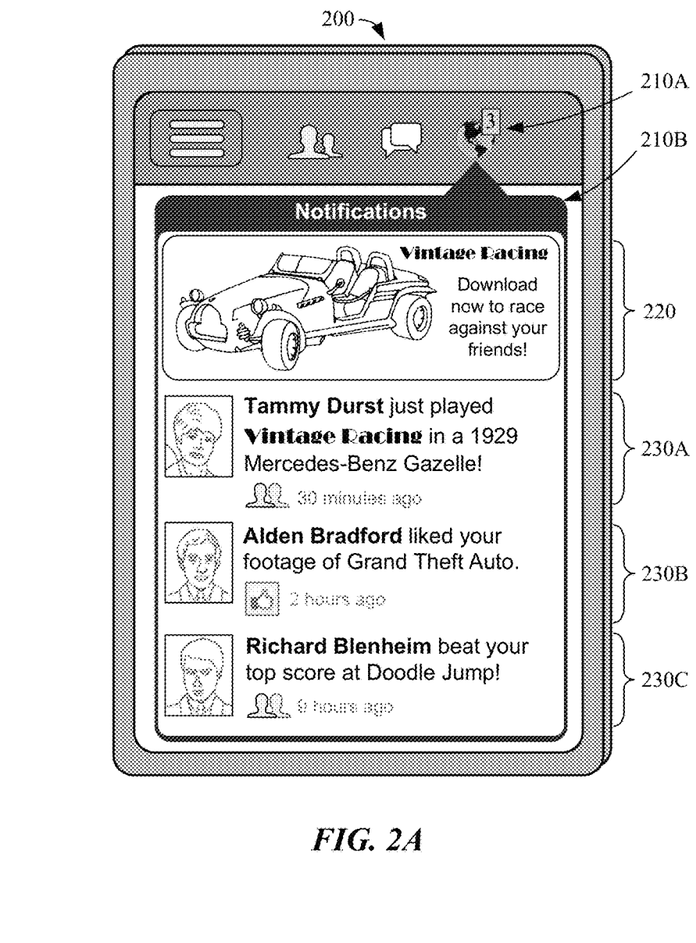
FIGS. 2A-B illustrate an example set of notifications accompanied by a relevant advertisement.
Figure 2B:
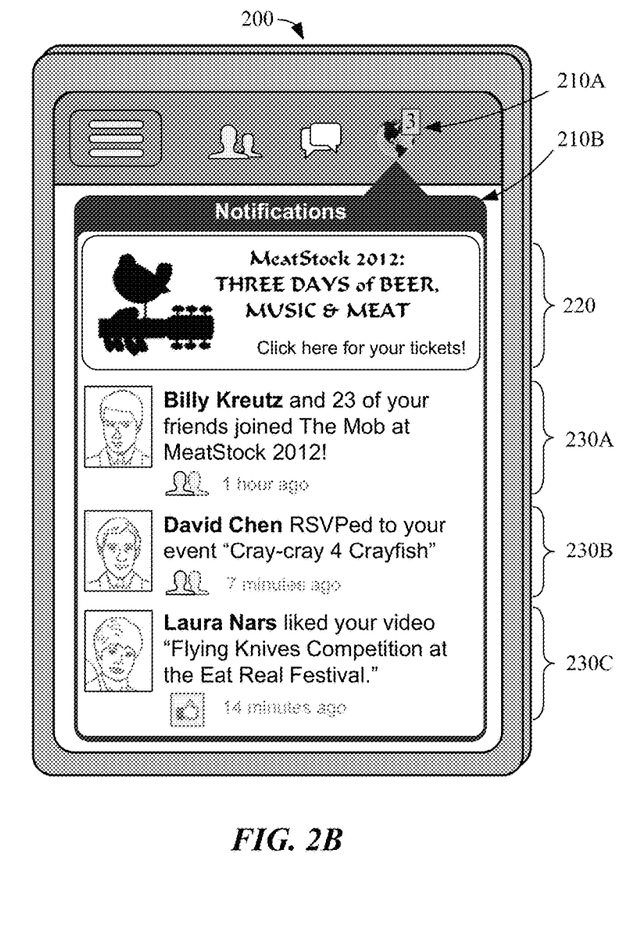

FIGS. 2A-B illustrate wireframes of an example set of notifications accompanied by a relevant advertisement. Example computing device 200 displays a notifications alert icon 210A indicating that there are three new notifications for a user of the social-networking system. When the user clicks on notifications alert icon 210A, a notifications window 210B for the user is displayed. In particular embodiments, notifications window 210B includes (1) an advertisement 220 and (2) notifications 230. Advertisement 220 is selected so as to be either relevant to notifications 230 or generally relevant to the user. The process of selecting advertisement 220 is discussed in further detail with respect to FIG. 3. Although advertisement 220 is displayed at the top of notifications window 210B, advertisement 220 may be positioned with respect to or incorporated into the content displayed in notifications window 210B in any manner.

FIG. 2A illustrates an advertisement 220 and three notifications 230A-C. Notification 230A notifies the user that a particular online social game "Vintage Racing" was recently played by a social connection of the user. Notification 230B notifies the user that a social connection of the user recently indicated that they liked the user's captured gameplay footage of the user playing the game "Grand Theft Auto." Notification 230C notifies the user that a social connection of the user recently beat the user's high score at the game "Doodle Jump." All of the notifications 230A-C describe social actions somehow related to video gaming. In this example embodiment, advertisement 220 was provided by the creator of "Vintage Racing" for delivery to users in conjunction with notifications relevant to gaming and also to gaming enthusiasts. The delivery of advertisement 220 to the user may indicate that a number of social connections of the user are engaging in social actions (and thereby generating notifications to the user) related to gaming. Alternatively, the delivery of advertisement 220 to the user may also be indicative of the user's own interests.

FIG. 2B also illustrates an advertisement 220 and three notifications 230A-C. Notification 230A notifies the user that a particular online social group "The Mob at MeatStock 2012" includes 23 social connections of the user. Notification 230B notifies the user that a social connection of the user recently responded to an invitation to an event hosted by the user "Cray-crag 4 Crayfish." Notification 230C notifies the user that a social connection of the user recently indicated that they liked the user's posted video entitled "Flying Knives Competition at the Eat Real Festival." All of the notifications 230A-C are related to foodie events. In this example embodiment, advertisement 220 was provided by the organizer of the food festival event "MeatStock 2012" for delivery to users in conjunction with notifications relevant to food-focused events and to "foodie" enthusiasts. The delivery of advertisement 220 to the user may indicate that a number of social connections of the user are engaging in social actions (and thereby generating notifications to the user) related to food-focused events. Alternatively, the delivery of advertisement 220 to the user may also be indicative of the user's own interests as a "foodie" enthusiast.

In particular embodiments, an advertisement 220 may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user). In addition or as an alternative, an advertisement 220 may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes by, for example, having the social action presented within a predetermined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Appln. Publ. No. US 2012/0203831, entitled "Sponsored Stories Unit Creation from Organic Activity Stream" and filed 3 Feb. 2012 as U.S. patent application Ser. No. 13/020,745, or U.S. Patent Appln. Publ. No. US 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

Third-party-content objects may be advertisements generated by one or more third parties, such as for example, a business, organization or individual. The third party may provide payment to highlight particular third-party-content objects or "sponsored stories." The third-party-content objects may include an informational-content object, incentive-content object, or a combination thereof. As an example and not by way of limitation, a sponsored story may include an address of a particular business and link to a bar or quick-response (QR) code that provides a discount on a purchase at the particular business. Although this disclosure describes and illustrates a notification with particular content and layout, this disclosure contemplates any notification with any suitable content and layout.

As described above, an advertisement 220 may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement 220 may be requested for display within third-party webpages, social-networking-system webpages, or other pages. An advertisement 220 may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement 220 may be displayed within an application or within a game. An advertisement 220 may be displayed within dedicated pages, requiring the user to interact with or watch the advertisement 220 before the user may access a page, utilize an application, or play a game. The user may, for example view the advertisement 220 through a web browser.

A user may interact with an advertisement 220 in any suitable manner. The user may click or otherwise select the advertisement 220, and the advertisement 220 may direct the user (or a browser or other application being used by the user) to a page associated with the advertisement 220. At the page associated with the advertisement 220, the user may take additional actions, such as purchasing a product or service associated with the advertisement 220, receiving information associated with the advertisement 220, or subscribing to a newsletter associated with the advertisement 220. An advertisement 220 with audio or video may be played by selecting a component of the advertisement 220 (like a "play button"). In particular embodiments, an advertisement 220 may include one or more games, which a user or other application may play in connection with the advertisement 220. An advertisement 220 may include functionality for responding to a poll or question in the advertisement 220.

An advertisement 220 may include social-networking-system functionality that a user may interact with. For example, an advertisement 220 may enable a user to "like" or otherwise endorse the advertisement 220 by selecting an icon or link associated with endorsement. Similarly, a user may share the advertisement 220 with another user (e.g., through social-networking system 160) or RSVP (e.g., through social-networking system 160) to an event associated with the advertisement 220. In addition or as an alternative, an advertisement 220 may include social-networking-system context directed to the user. For example, an advertisement 220 may display information about a friend of the user within social-networking system 160 who has taken an action associated with the subject matter of the advertisement 220.

Social-networking-system functionality or context may be associated with an advertisement 220 in any suitable manner. For example, an advertising system (which may include hardware, software, or both for receiving bids for advertisements and selecting advertisements in response) may retrieve social-networking functionality or context from social-networking system 160 and incorporate the retrieved social-networking functionality or context into the advertisement 220 before serving the advertisement to a user. Examples of selecting and providing social-networking-system functionality or context with an advertisement are disclosed in U.S. Patent Appln. Publ. No. US 2012/0084160, entitled "Providing Social Endorsements with Online Advertising" and filed 5 Oct. 2010 as U.S. patent application Ser. No. 12/898,662, and in U.S. Patent Appln. Publ. No. US 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement 220 that is associated with social-networking-system functionality or context may cause information about the interaction to be displayed in a profile page of the user in social-networking-system 160.

An advertisement 220 may be presented or otherwise delivered using plug-ins for web browsers or other applications, iframe elements, news feeds, tickers, notifications (which may include, for example, e-mail, Short Message Service (SMS) messages, or notifications), or other means. An advertisement 220 may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Appln. Publ. No. US 2012/0159635, entitled "Comment Plug-In for Third-Party System" and filed 15 Dec. 2010 as U.S. patent application Ser. No. 12/969,368; U.S. Patent Appln. Publ. No. US 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Patent Appln. Publ. No. US 2008/0040475, entitled "Providing a News Feed Based on User Affinity in a Social Network Environment" and filed 11 Aug. 2006 as U.S. patent application Ser. No. 11/503,093; U.S. Patent Appln. Publ. No. US 2012/0072428, entitled "Action Clustering for News Feeds" and filed 16 Sep. 2010 as U.S. patent application Ser. No. 12/884,010; U.S. Patent Appln. Publ. No. US 2001/0004692, entitled "Gathering Information about Connections in a Social Networking Service" and filed 1 Jul. 2009 as U.S. patent application Ser. No. 12/496,606; U.S. Patent Appln. Publ. No. US 2008/0065701, entitled "Method and System for Tracking Changes to User Content in an Online Social Network" and filed 12 Sep. 2006 as U.S. patent application Ser. No. 11/531,154; U.S. Patent Appln. Publ. No. US 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Appln. Publ. No. US 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Appln. Publ. No. US 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

Figure 3:
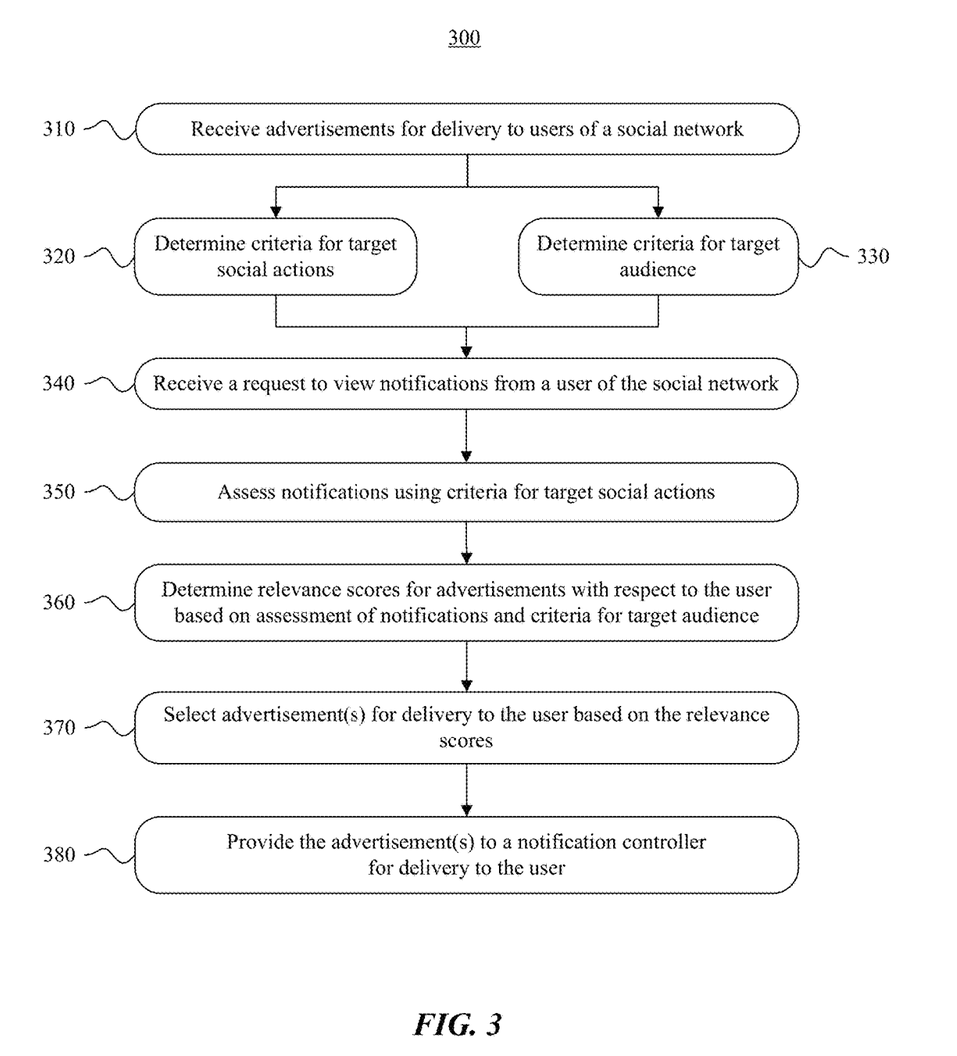
FIG. 3 illustrates an example method for selecting and presenting a set of notifications with a relevant advertisement.

FIG. 3 illustrates an example method 300 for selecting and presenting a set of notifications with a relevant advertisement. In different embodiments, the steps of example method 300 may occur on a computer server, on a client device, or a combination thereof.

In step 310, particular embodiments receive advertisements from an advertiser for delivery to users of a social-networking system. The advertisement may be received from a vendor or retailer. The advertisement may comprise any type of content, for example and not by way of limitation: text, graphics, video, audio, other multimedia content. The advertisement may also be linked to a promotion associated with the vendor or retailer, and the promotion may be described or alluded to in the content (e.g., "10% off," "buy one, get one ½ half off," "click before the link expires in the next 10 seconds," "refer two friends for 20% off your next purchase").

The social-networking system 160 may receive third-party-content objects from one or more third parties, such as for example, a business, organization or individual. As used herein, third-party-content objects include any suitable content object generated by a third party in contrast to content objects generated by user nodes of the social graph. The third-party-content objects may be advertisement that includes informational-content objects, such as movie show times, movie reviews, sale information, restaurant menus, etc., as well as incentive-content objects, such as for example coupons, discount tickets, gift certificates, etc. In particular embodiments, third-party-content objects may be a combination of informational-content and incentive-content objects. In particular embodiments, a third party may provide payment to highlight particular third-party-content objects or "sponsored stories". The sponsored stories may be presented to the user in response to activity initiated by one or more user nodes in the social graph of the user. As an example and not by way of limitation, when a user node in the social graph "checks in" at a particular location, a third-party-content object associated with the particular location may be presented to user. As another example, a third-party-content object may be presented to the user in response to a user node in the social graph sharing content from an application that has paid for the sponsored story.

In step 320, particular embodiments determine criteria for target social actions in the social network. The actions in the social network may be related to information associated with a particular entity, event, website, brand, product, service, or concept. Social graph actions may include, by way of example and not limitation: playing (an online game), downloading or installing an app, "liking" content, commenting on content, sharing content, disavowing (e.g., when someone tagged you in a photo or post), making a purchase, adding an item/user/entity to a list or collection, responding to an invitation, hiding and/or blocking (e.g., particular types of content or content associated with particular users). The criteria may be provided by the advertiser. For example, a third party may provide an advertisement for a social-networking game along with criteria specifying that it can be delivered to any first- or second-degree social connection of a user who has recently downloaded, installed, or played the game or who has joined an interest group affiliated with the game. In another example, a third party may provide an advertisement for an event along with criteria specifying that it can be delivered to any first- or second-degree social connection of a user who has recently purchased tickets to the event, rsvp'ed to attend the event, checked in as being present at the event, or joined an interest group affiliated with the event.

For example, as illustrated in FIG. 2A, with the provider of advertisement 220 may have specified that the criteria for target social actions are those related to competitive real-time online gaming; with respect to FIG. 2B, the target social actions may be those related to attending or documenting large-scale, public food-focused events.

In step 330, particular embodiments determine criteria for a target audience of users of the social network. The target audience may also be based upon the advertiser's specifications, such as, by way of example and not limitation: (1) users having profile information falling within a target profile (e.g., gender, age bracket, parent, student, relationship status, sexual preference); (2) users in a particular locale (e.g., "Madison, Wis.," zip code 10032, "South of Houston" (SoHo), Stanford campus); (3) users indicating a particular income range; (4) users having a particular purchasing history or consumer profile; (5) users with particular expressed interests (e.g., NCAA basketball, K-pop, epicurean tours, bass fishing, political debates, Mad Men); (6) users having certain group or organizational affiliations (e.g., "member of AARP," "employee of Boeing,""; (7) users employed in particular industries; (8) users traversing a particular area on a regular basis (e.g., while walking or commuting from home to work or school).

For example, as illustrated in FIG. 2A, with the provider of advertisement 220 may have specified that the criteria for the target audience of users of the social network are those that have explicitly or implicitly expressed an interest in competitive real-time online gaming; with respect to FIG. 2B, the target social actions may be those related to attending or documenting large-scale, public food-focused events. For example, an interest may be explicitly expressed by flagging the exact or closely-related topics in a list of interests associated with the user's profile. And, for example, an interest may be implicitly expressed by signing up for a gaming competition, by playing/downloading/installing games often, or by showing a pattern of actively viewing, commenting on, or "liking" competitive real-time online gameplay-related content generated by or posted by social connections of the user.

With respect to steps 320 and 330, particular embodiments may facilitate the delivery of advertisements 220 to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Appln. Publ. No. US 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Appln. Publ. No. US 2009/0070219, entitled "Targeting Advertisements in a Social Network" and filed 20 Aug. 2008 as U.S. patent application Ser. No. 12/195,321; U.S. Patent Appln. Publ. No. US 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Appln. Publ. No. US 2012/0166532, entitled "Contextually Relevant Affinity Prediction in a Social-Networking System" and filed 23 Dec. 2010 as U.S. patent application Ser. No. 12/978,265.

In step 340, particular embodiments receive a request to view notifications from a user of the social network. As illustrated in the examples shown in FIGS. 2A-B, the user's device may have displayed a notifications alert icon 210A indicating that there are new notifications for the user. When the user performs an input gesture (e.g., clicking on notifications alert icon 210A) in order to view the new notifications, a request may be received by the user's client device. In particular embodiments, the request may be sent to computer servers associated with the social-networking system in order to retrieve any new notifications ("pull" model). In particular embodiments, the information to display each new notification in notifications window 210B may already have been sent out asynchronously and transparently by the computer servers out to the user's client device as the event behind each notification occurred or was detected ("push" model).

In step 350, particular embodiments assess notifications using the criteria for target social actions. Particular embodiments determine, for each notification, which elements of the social graph (i.e., the nodes and edges) are involved in each notification. In a "pull" model, particular embodiments assess the most recently-received notifications, which may include both notifications not yet sent to the server and notifications which have already been sent to the user. In a "push" model, where notifications are sent to the user as the underlying events occur or are detected, particular embodiments may assess the most recently-sent notifications.

For example, as illustrated in FIG. 2A, when notifications 230A-C are assessed using the criteria for target social actions provided by the provider of advertisement 220, particular embodiments may determine that the notifications (all of them, or a critical mass thereof) are indeed related to competitive real-time online gaming. Therefore, these notifications fall within the context targeted by the provider of advertisement 220 as appropriate for delivery of advertisement 220. However, in particular embodiments, another determination may also need to be made with respect to the relevance of advertisement 220 to the user.

In particular embodiments, criteria for multiple advertisements may be organized by category and/or indexed for rapid access while performing this assessment. For example, advertisement 220 of FIG. 2A may be categorized under "Gaming>>Competitive>>Social" and also under "Software Downloads>>Games>>Auto Racing" or indexed according to particular keywords, e.g., "gaming," "racing," "competitive," etc.

In step 360, particular embodiments determine relevance scores for advertisements with respect to the user based on the assessment of notifications described above and/or any specified criteria for a target audience. The relevance score may be based at least in part on location value, interest value, connection value, and time value. Third-party-content objects may be assigned to categories, locations, or delivery-time ranges by social-networking system 160. As an example and not by way of limitation, categories may be established by the social-networking system 160 that reflect interests of users of social-networking system 160. In particular embodiments, social-networking system 160 may assign multiple categories to each third-party-content object. In particular embodiments, a location may be assigned to third-party-content objects. A location may be general, such as for example a city, or specific, such as for example a particular street name, intersection, or GPS coordinate. One or more locations may be assigned to each third-party content object. In particular embodiments, a delivery-time range may be assigned to a third-party-content object. The delivery-time range may reflect appropriate hours for the third-party-content object. As an example and not by way of limitation, if the third-party-content object is a coupon for a particular business that is open only in the morning, the range for the notification likely would correspond to the operating hours of the particular business, or some other useful range related to the operating hours, e.g. fifteen minutes before opening to thirty minutes before closing.

Social-networking system 160 may determine a time value for a third-party-content object based on whether the current time is within the delivery-time range for the third-party-content object. In particular embodiments, social-networking system 160 determines a location value for a third-party-content object based on the proximity between the third-party-content object location and a current location associated with client device 130. As an example and not by way of limitation, a coupon for a discount on a movie ticket at a particular movie theater chain may apply to all theaters in the chain, or a particular theater.

In particular embodiments, the social-networking system 160 determines a connection value for a third-party-content object based at least in part on the user nodes and connections of the social graph associated with the third-party-content object, as described above. As an example and not by way of limitation, a connection associated with the third-party-content object may include information or a coupon for a business that a user node of the social is frequenting, e.g. a user node of the social graph is at the frozen yogurt store that the incentive applies to. In particular embodiments, the processing module of the content engine may modify the connection values by applying one or more weighting factors. As an example and not by way of limitation, a degree of separation between user nodes of the social graph and the user may affect the connection value. As another example, the type of connection between the user and the user nodes of the social graph user may affect the connection value. As an example and not by way of limitation, "friendship"-type connections may be associated with a higher connection value than a "work colleague"-type connection. Although this disclosure describes a relevance score based on particular types of values, this disclosure contemplates a relevance score based on any suitable types of values.

In particular embodiments, social-networking system 160 may determine a relevance score based at least in part on whether the category or categories assigned to the third-party-content object coincide with the category or categories associated with the user's interests. In particular embodiments, the relevance score may be based on information associated with an object in the social graph of the user, information associated with an action taken with respect to the social graph, or information related to the user that is received at social-networking system 160 from a third party. As an example and not by way of limitation, an object in the social graph may include a user or concept profile, or information associated with a user node that is connected to the user. As another example, an action may include friending/unfriending a user node, "liking" a content object, becoming a fan of a third party, joining a group or community of users on social-networking system 160, or visiting a website of a third party. As another example, third-party information may include information of activity of the user or purchases by the user on a third-party website. Although this disclosure describes a relevance score based on particular information or actions associated with the user, this disclosure contemplates a relevance score based on any suitable information or actions associated with the user. Determination of relevance scores is discussed in further detail in U.S. patent application Ser. No. 12/976,859, filed 22 Dec. 2010 and titled "Timing for Providing Relevant Notifications for a User Based on User Interaction with Notifications," which is incorporated herein by reference.

In particular embodiments, the relevance score is based at least in part to an affinity for the user with respect to the object of the social graph, as described above. As an example and not by way of limitation, affinity for past, present, or future content may be determined by the processing module of the content engine based on user activities, activities of the user nodes of the social graph, or associated connections, or any combination thereof. Any type of variable may be considered when determining affinity to weight the aggregated consolidated data. In particular embodiments, affinity may be calculated using a weighted set of predictor functions. Predictor functions predict whether the user will perform a particular action. The predictor functions may predict any number of actions, which may be within or outside of the social networking system. In particular embodiments, the processing module ranks the aggregated consolidated data by relevance score to dynamically generate content personalized for the users of social-networking system 160. In particular embodiments, the processing module of the content engine may combine the location value, interest value, connection value, and time value to determine the relevance score for the third-party content object with respect to the user. The dynamically generated content personalized for the users of social-networking system 160 may be stored in a data store described above.

Determination and use of measures of affinity are discussed in further detail in the following U.S. patent applications, all of which are incorporated herein by reference: U.S. patent application Ser. No. 11/502,757, filed on 11 Aug. 2006, titled "Generating a Feed of Stories Personalized for Members of a Social Network," and issued as U.S. Pat. No. 7,827,208; U.S. patent application Ser. No. 12/645,481, filed on 23 Dec. 2009 and titled "Selection and Presentation of Related Social Networking System Content and Advertisements;" U.S. patent application Ser. No. 13/247,825, filed on 28 Sep. 2011 and titled "Instantaneous Recommendation of Social Interactions in a Social Networking System;" U.S. patent application Ser. No. 12/976,755, filed on 22 Dec. 2010 and titled "Pricing Relevant Notifications Provided to a User Based on Location and Social Information;" U.S. patent application Ser. No. 12/978,265, filed on 23 Dec. 2010 and titled "Contextually Relevant Affinity Prediction in a Social Networking System;" and U.S. patent application Ser. No. 13/632,869, filed on 1 Oct. 2012 and titled "Mobile Device-Related Measures of Affinity."

In step 370, particular embodiments select advertisement(s) for delivery to the user based on the relevance scores. The processing module of the content engine may select particular third-party-content objects (e.g., advertisements) based on the relevance score for the third-party content object with respect to the user. In addition to the calculated relevance score, the processing module of the content engine may select particular third-party-content objects provided to the user's computing device based at least in part on characteristics of the computing device, characteristics of the service network servicing the computing device, characteristics of usage of the computing device, or the user's interactions with the social-networking system through the computing device.

Characteristics of the computing device may include the device manufacturer, device model, OS (e.g. IOS or ANDROID), OS version (JELLYBEAN or FROYO), resolution of display 300, audio, haptic feedback, amount of battery life, memory capacity, processor speed, networking, types of sensors, or location. In particular embodiments, the publisher of the content engine may configure the selected third-party-content object based on the characteristics of the computing device. As an example and not by way of limitation, the publisher may configure the advertisement 220 based on the resolution of the display of the user's computing device. As another example, the embedded third-party-content object may be an ADOBE FLASH-based video for an ANDROID OS computing device or HTML5-based video for an IOS computing device.

Characteristics of the service network may include the type and quality of wireless communication signal, e.g. Wi-Fi or 4G, bandwidth availability, signal strength at a particular geographic location, service type, or security of the data connection. As an example and not by way of limitation, a relatively large-sized third-party-content object may be embedded into advertisement 220 when the user's computing device is connected to a higher-bandwidth network connection. For example, a low-resolution image may be replaced with a high-resolution image, or even a video.

Characteristics of usage may include configuration settings, installed software applications, or usage history of the user's computing device. As an example and not by way of limitation, the usage history may include activity using the telephone features such as for example making a telephone call, receiving a telephone call, declining a telephone call, sending a telephone call directly to voicemail, listening to a voicemail, deleting a voicemail without listening to it, blocking telephone calls from a particular telephone number, or restricting telephone calls to certain types of telephone numbers. As another example, the usage history may include activity regarding contact information such as for example adding the telephone number for a received telephone call to a list of contacts, deleting an entry from the list of contacts, or searching through the list of contacts. As another example, the usage history may include activity regarding applications on the user's computing device such as for example installing an application on the user's computing device, deleting an application, using an application, inviting a connection to perform an activity through an application, or playing a game. As another example, the usage history may include activity using features of the user's computing device such as for example, sending short-message service (SMS) or multimedia messaging service (MMS) messages, taking pictures, or using GPS or maps. Although this disclosure describes selecting third-party-content objects using particular characteristics associated with the user's computing device, this disclosure contemplates selecting third-party-content objects using any suitable characteristics associated with the user's computing device.

In step 380, particular embodiments provide the sponsored stories to a notification controller for delivery to the user. Embodiments of a notification controller were described in further detail with respect to FIG. 1.

Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Figure 4:
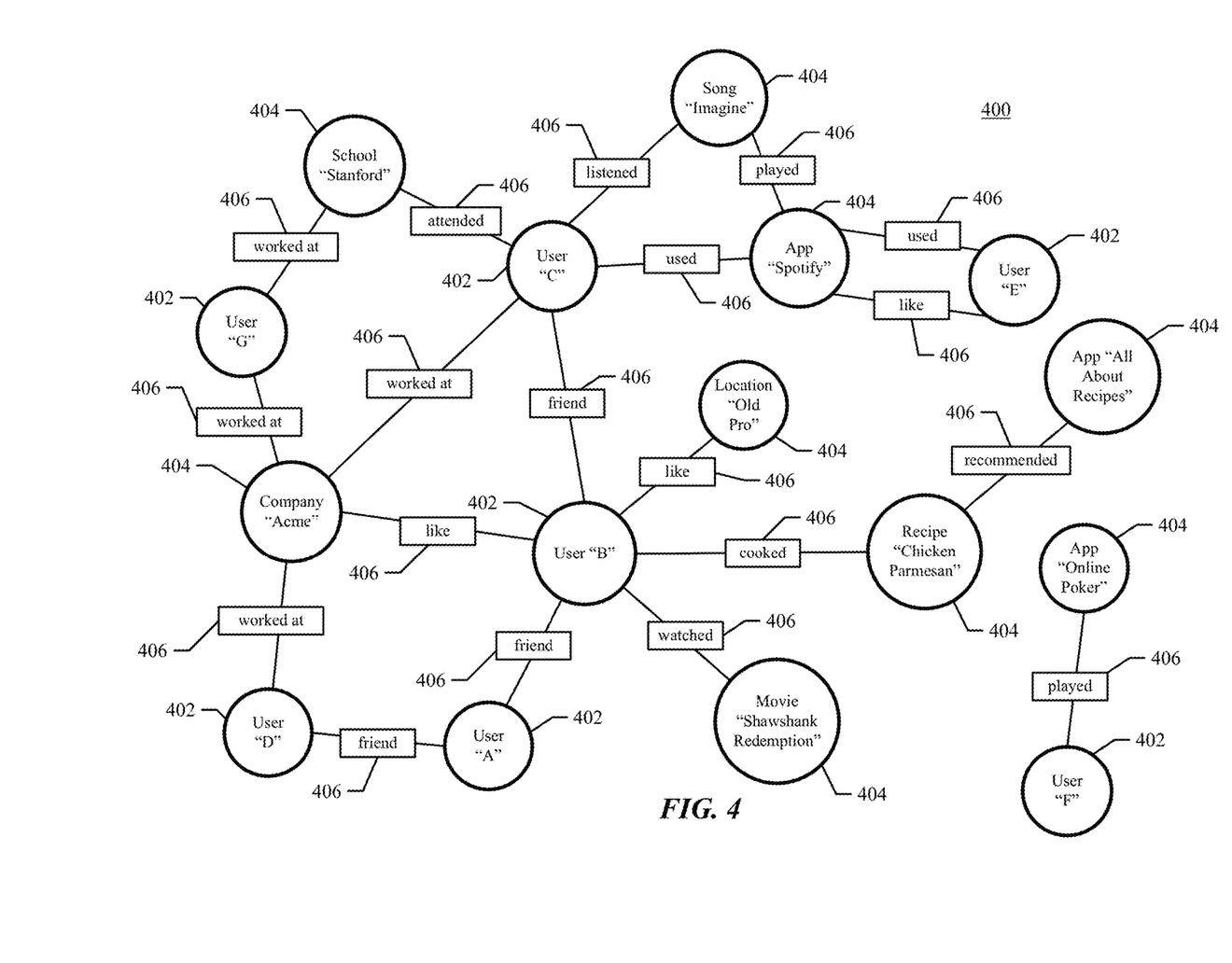
FIG. 4 illustrates an example social graph.

FIG. 4 illustrates example social graph 400. In particular embodiments, social-networking system 160 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 160, client system 130, or third-party system 170 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 160. In particular embodiments, a user node 402 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 404 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge)

between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 406 connecting the first user's user node 402 to the second user's user node 402 in social graph 400 and store edge 406 as social-graph information in one or more of data stores 24. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to a edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 160 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 160 may create an edge 406 between a user node 402 and a concept node 404 in social graph 400. As an example and not by way of limitation, a user viewing a concept-profile page (such as, for example, by using a web browser or a special-purpose application hosted by the user's client system 130) may indicate that he or she likes the concept represented by the concept node 404 by clicking or selecting a "Like" icon, which may cause the user's client system 130 to send to social-networking system 160 a message indicating the user's liking of the concept associated with the concept-profile page. In response to the message, social-networking system 160 may create an edge 406 between user node 402 associated with the user and concept node 404, as illustrated by "like" edge 406 between the user and concept node 404. In particular embodiments, social-networking system 160 may store an edge 406 in one or more data stores. In particular embodiments, an edge 406 may be automatically formed by social-networking system 160 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

Figure 5:
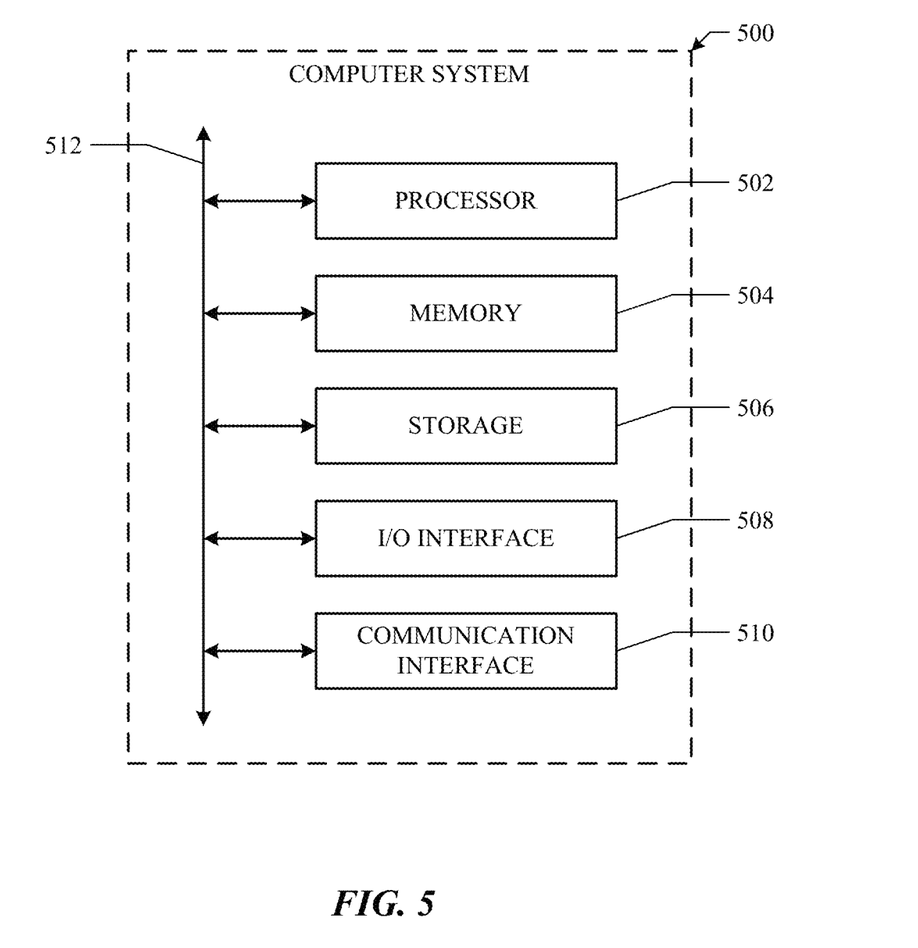
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a Wi-Fi network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, by one or more processors of one or more computing devices associated with a social networking system, a request to view notifications from a first user of the social networking system;
   assessing, by one or more processors of one or more computing devices associated with a social networking system, one or more notifications for the first user of the social networking system based on one or more predetermined criteria specifying one or more target social actions of one or more second users of the social networking system, wherein:
     the one or more predetermined criteria are associated with one or more advertisements;
     the one or more second users are indicated in the one or more notifications;
     the social networking system comprises a social graph that comprises a plurality of nodes and edges connecting the nodes;
     the first user corresponding to at least a first node;
     each of the second users corresponding to at least a second node, each second node connected to the first node via a connecting set of one or more edges; and at least one of the target social actions match a social action indicated by the connecting set of one or more edges;
determining, by the one or more computing devices associated with the social networking system, for at least one of the advertisements, one or more relevance scores for the first user, the relevance scores for the advertisements are based at least on a time-based property assigned to the advertisement and the current value of that property for the first user, and wherein the relevance score for an advertisement changes based on whether a current time matches a time-based property of the advertisement;
selecting, by the one or more computing devices associated with the social networking system, at least one of the advertisements for the first user, wherein the relevance score for the selected advertisement exceeds a pre-determined threshold score; and
transmitting, by the one or more computing devices associated with the social networking system, the selected advertisements for delivery to a client device of the first user to cause the client device of the first user to display the selected advertisements to the first user in a notifications window user interface (UI) of a computing device of the first user when the first user selects a notifications alert icon UI element, wherein the selected advertisements presented in the notifications window user interface are adjacent to the one or more related notifications that are presented in the notifications window user interface.

2. The method of claim 1, wherein the one or more advertisements are received from a third-party system.

3. The method of claim 1, wherein at least one of the criteria for target social actions associated with at least one of the advertisements are received from a third-party system.

4. The method of claim 1, wherein the relevance scores for the advertisements are based on one or more location values, one or more interest values, one or more connection values, or any combination thereof.

5. The method of claim 1, wherein the relevance scores are based on affinity scores between the first user and the second users as determined by the social-networking system.

6. The method of claim 1, wherein the at least one of the advertisements is selected based additionally on:
one or more properties of a computing, device associated with the first user;
one or more properties of network the computing device is connected to; connected,
a profile of the first user in the social-networking system;
the first user's usage of the computing device;
the first user's interactions with the social-networking system; or
any combination thereof.

7. The method of claim 6, wherein categories of the properties of the computing device comprise visual display, audio, haptic feedback, battery life, memory capacity, processor speed, networking, sensors, operating system, location, or any combination thereof.

8. The method of claim 6, wherein categories of the properties of the network comprise bandwidth availability, signal strength at a particular geographic location, service type, security, or any combination thereof.

9. The method of claim 6, wherein categories related to the first user's usage of the computing device comprise configuration settings, software applications, usage history, or any combination thereof.

10. The method of claim 1, wherein the selected at least one of the advertisements is provided in response to a request from the first user to view notifications.

11. One or more computer-readable non-transitory storage media embodying software that is operable when executed by one or more processors of one or more computing devices associated with a social networking system to:
receive, by one or more processors of one or more computing devices associated with a social networking system, a request to view notifications from a first user of the social networking system;
assess one or more notifications for the first user of a social-networking system based on one or more pre-determined criteria specifying one or more target social actions of one or more second users of the social-networking system, wherein:
the one or more predetermined criteria are associated with one or more advertisements;
the one or more second users are indicated in the one or more notifications;
the social-networking system comprises a social graph that comprises a plurality of nodes and edges connecting the nodes;
the first user corresponding to at least a first node;
each of the second users corresponding to at least a second node, each second node connected to the first node via a connecting set of one or more edges
at least one of the target social actions match a social action indicated by the connecting set of one or more edges;
determine for at least one of the advertisements, one or more relevance scores for the first user, the relevance scores for the advertisements are based at least on a time-based property assigned to the advertisement and the current value of that property for the first user, and wherein relevance score for an advertisement changes based on whether a current time matches the time-based property of the advertisement;
select at least one of the advertisements for the first user, wherein the relevance score for the selected advertisement exceeds a pre-determined threshold score; and
transmit the selected advertisements for delivery to a client device of the first user to cause the client device of the first user to display the selected advertisements to the first user in a notifications window user interface (UI) of a computing device of the first user when the first user selects a notifications alert icon UI element, wherein the selected advertisements presented in the notifications window user interface are adjacent to the one or more related notifications that are presented in the notifications window user interface.

12. The media of claim 11 wherein the one or more advertisements are received from a third-party system.

13. The media of claim 11 wherein at least one of the criteria for target social actions associated with at least one of the advertisements are received from a third-party system.

14. A system comprising:
one or more processors associated with one or more computer servers associated with a social-networking system; and
a memory coupled to the one or more processors comprising instructions executable by the one or more processors, the one or more processors being operable when executing the instructions to:
receive, by one or more processors of one or more computing devices associated with a social networking system, a request to view notifications from a first user of the social networking system;
assess one or more notifications for the first user of a social-networking system based on one or more predetermined criteria specifying one or more target social actions of one or more second users of the social_networking system, wherein;
  the one or more predetermined criteria are associated with one or more advertisements;
  the one or more second users are indicated in the one or more notifications;
  the social-networking system comprises a social graph that comprises a plurality of nodes and edges connecting the nodes;
  the first user corresponding to at least a first node;
  each of the second users corresponding to at least a second node, each second node connected to the first node via a connecting set of one or more edges; and
  at least one of the target social actions match a social action indicated by the connecting set of one or more edges;
determine for at least one of the advertisements, one or more relevance scores for the first user, the relevance scores for the advertisements are based at least on a time-based property assigned to the advertisement and the current value of that property for the first user, and wherein relevance score for an advertisement changes based on whether a current time matches the time-based property of the advertisement;
select at least one of the advertisements for the first user, wherein the relevance score for the selected advertisement exceeds a pre-determined threshold score; and
transmit the selected advertisements for delivery to a client device of to the first user to cause the client device of the first user to display the selected advertisements to the first user in a notifications window user interface (UI) of a computing device of the first user when the first user selects a notifications alert icon UI element, wherein the selected advertisements presented in the notifications window user interface are adjacent to the one or more related notifications that are presented in the notifications window user interface.

15. The system of claim 14, wherein the at least one of the advertisements is selected based additionally on:
  one or more properties of a computing device associated with the first user;
  one or more properties of network the computing device is connected to;
  a profile of the first user in the social-networking system;
  the first user's usage of the computing device;
  the first user's interactions with the social-networking system; or any combination thereof.

* * * * *

UNITED STATES PATENT AND TRADEMARK OFFICE
CERTIFICATE OF CORRECTION

PATENT NO. : 10,423,984 B2
APPLICATION NO. : 13/653057
DATED : September 24, 2019
INVENTOR(S) : Jonathan Arie Matus Page 1 of 1

It is certified that error appears in the above-identified patent and that said Letters Patent is hereby corrected as shown below:

In the Claims

Column 25, Claim 6, Line 46, delete "computing, device" and insert --computing device--, therefor.

Column 25, Claim 6, Line 49, delete "connected,".

Column 26, Claim 11, Line 4, delete "One or more" and insert --A--, therefor.

Column 27, Claim 14, Line 7, delete "social_networking" and insert --social-networking--, therefor.

Column 28, Claim 14, Line 8, delete "of to the" and insert --of the--, therefor.

Signed and Sealed this
Third Day of November, 2020

Andrei Iancu
*Director of the United States Patent and Trademark Office*